(12) United States Patent
Shimazaki

(10) Patent No.: US 7,920,283 B2
(45) Date of Patent: Apr. 5, 2011

(54) PRINTING APPARATUS AND PRINT CONTROL METHOD AND PRINT SYSTEM

(75) Inventor: Atsushi Shimazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1113 days.

(21) Appl. No.: 11/653,950

(22) Filed: Jan. 17, 2007

(65) Prior Publication Data

US 2007/0171456 A1 Jul. 26, 2007

(30) Foreign Application Priority Data

Jan. 23, 2006 (JP) ................................ 2006-014301

(51) Int. Cl.
*G06F 15/00* (2006.01)
*G06F 15/16* (2006.01)
(52) U.S. Cl. ........................................ 358/1.15; 709/203
(58) Field of Classification Search .................. 358/1.15, 358/1.12, 1.13, 1.14, 1.16, 1.18, 1.1, 1.9, 358/451, 448, 468, 474, 539, 2.1, 402, 3.06; 709/203, 217, 201, 200, 227, 208; 382/167, 382/275, 170, 168; 400/76, 61, 82; 715/234, 715/250, 273, 763
See application file for complete search history.

(56) References Cited

U.S. PATENT DOCUMENTS 5,467,434 A * 11/1995 Hower et al. ................ 358/1.15

FOREIGN PATENT DOCUMENTS

| JP | 2003-300372 A | 10/2003 |
| JP | 2005031859 | 2/2005 |
| JP | 2005050299 | 2/2005 |

OTHER PUBLICATIONS

Japanese Office Action dated Nov. 22, 2010 concerning JP Application No. 2006-014301.

* cited by examiner

*Primary Examiner* — Saeid Ebrahimi Dehkordy
(74) *Attorney, Agent, or Firm* — Fitzpatrick, Cella, Harper & Scinto

(57) ABSTRACT

When print data described in structured language is received from a transmitter, the print data is analyzed by an analysis unit and a determination is made as to whether or not there is unprintable data in the print data. A condition table stores print conditions for determining printability by a print unit, these print conditions being associated with print settings information that has been set with respect to the print data, and a condition determination unit controls printing by the print unit by referencing the condition table based on an analysis result of the analysis unit and the print settings information.

20 Claims, 17 Drawing Sheets

FIG. 6

```
<head>
    <title>Testing CSS Constructs</title>
    <style type="text/css">
    div{width:2in;font-size:20pt;>
    . noclip{background-color:yellow;}
    . clipit{background-color:lime;
                                            601
              overflow:hidden;
              position:absolute;
              clip:rect(0in, 1in, 1in, 1in, 0in);}
    </style>
</head>

<body>
  <h1>Testing clip</h1>
  <h2>Below should be two rectangles with in them.
       The second one should be clipped in half.</h2>
  <div class="noclip"> This is just some text that will be used to
  fill space in this test. </div>
                                                            602
  <div class="clipit"> This is just some text that will be used to
  fill space in this test. </div>
     <h2>end of test</h2>
</body>
```

FIG. 7

```
<Body>
  <PrinterState>Stopped</PrinterState>
  <PrinterStateReasons>attention-required</PrinterStateReasons>
  <ErrorResponse>
    <PrinterErrorState>XHTML-parsing-error</PrinterErrorState>
    <ErrorReasons>
      <ErrorReasonsDetails>                                    ~701
        <LineNumber>7</LineNumber>
        <ErrorToken>overflow</ErrorToken>
      </ErrorReasonsDetails>
      <ErrorReasonsDetails>
        <LineNumber>8</LineNumber>
        <ErrorToken>position</ErrorToken>
      </ErrorReasonsDetails>
      <ErrorReasonsDetails>
        <LineNumber>9</LineNumber>
        <ErrorToken>clip</ErrorToken>
      </ErrorReasonsDetails>
                                                              702
      <IncompletePartDetails>
        <LineNumber>19-20</LineNumber>
        <IncompleteContents>This is just some te</IncompleteContents>
      </IncompletePartDetails>
    </ErrorReasons>
  </ErrorResponse>
</Body>
```

FIG. 8

| PRINT SETTING | | PRINT CONDITION | |
|---|---|---|---|
| QUALITY SETTING | PAPER SETTING | NORMAL ERROR | IMAGE ERROR |
| DRAFT PRINTING | PLAIN PAPER | • ERROR     PRINT (CONFIRM PRINTING WHEN THERE ARE A PLURALITY OF COPIES TO BE PRINTED) | PRINT |
| NORMAL PRINTING | PLAIN PAPER | • NUMBER OF ERRORS = 1    PRINT (CONFIRM PRINTING WHEN THERE ARE A PLURALITY OF COPIES TO BE PRINTED) <br> • NUMBER OF ERRORS ≧ 2    CONFIRM PRINTING | PRINT    801 <br><br> 804 |
| | HIGH QUALITY PAPER | • ERROR     CONFIRM PRINTING | SAME AS LEFT |
| HIGH QUALITY PRINTING | PLAIN PAPER | • ERROR     CONFIRM PRINTING | SAME AS LEFT    802 |
| | HIGH QUALITY PAPER | • ERROR     STOP PRINTING | SAME AS LEFT |

| PRINT SETTING | | PRINT CONDITION | |
|---|---|---|---|
| QUALITY SETTING | PAPER SETTING | NORMAL ERROR | IMAGE ERROR |
| DRAFT PRINTING | PLAIN PAPER | • ERROR  PRINT (CONFIRM PRINTING WHEN THERE ARE A PLURALITY OF COPIES TO BE PRINTED) | PRINT |
| NORMAL PRINTING | PLAIN PAPER | • UNPRINTABLE PROPORTION < 2%  PRINT (CONFIRM PRINTING WHEN THERE ARE A PLURALITY OF COPIES TO BE PRINTED) <br>• UNPRINTABLE PROPORTION ≧ 2%  CONFIRM PRINTING | PRINT |
| | HIGH QUALITY PAPER | • ERROR  CONFIRM PRINTING | SAME AS LEFT |
| HIGH QUALITY PRINTING | PLAIN PAPER | • ERROR  CONFIRM PRINTING | SAME AS LEFT |
| | HIGH QUALITY PAPER | • ERROR  STOP PRINTING | SAME AS LEFT |

EXAMPLE 2 OF XHTML DATA

```
<head>
   <title>Testing image link</title>
</head>

<body>
   <h1>Testing image link</h1>
   <img src="test_file1.jpg" alt="test picture1" />
   <img src="http://localhost/test_file2.jpg" alt="test picture2" />
   <img src="http://XXX.COM/test_file3.jpg" alt="test picture3" />
   <h1>end of test</h1>
</body>
```

| PRINT SETTING | | PRINT CONDITION | |
|---|---|---|---|
| QUALITY SETTING | PAPER SETTING | NORMAL ERROR | IMAGE ERROR |
| DRAFT PRINTING | PLAIN PAPER | PRINT | PRINT |
| NORMAL PRINTING | PLAIN PAPER | PRINTING OF DATA STOPPED, POSSIBLE TO PRINT REASON | PRINT |
| | HIGH QUALITY PAPER | PRINTING OF DATA STOPPED, IMPOSSIBLE TO PRINT REASON | SAME AS LEFT |
| HIGH QUALITY PRINTING | PLAIN PAPER | PRINTING OF DATA STOPPED, POSSIBLE TO PRINT REASON | SAME AS LEFT |
| | HIGH QUALITY PAPER | PRINTING OF DATA STOPPED, IMPOSSIBLE TO PRINT REASON | SAME AS LEFT |

1501
1502
1503

PRINTING APPARATUS AND PRINT CONTROL METHOD AND PRINT SYSTEM

BACKGROUND OF THE INVENTION

1. Field of the Invention

The present invention relates to a printing apparatus, print control method, and a print system in which printing is performed by receiving data described in structured language.

2. Description of the Related Art

Currently, a wide range of content is described in structured language, a representative of which is HTML or the like, and used as data for display. In particular, HTML and XHTML are used on the World Wide Web, and BML (broadcast markup language) is used in BS data broadcasts and DTV (digital television).

The need to print such types of contents has increased along with their use, and in regard to standards, there is a call for printing XHTML-Print data as the standard for printing with UPnP and Bluetooth. Currently, printers provided with functionality for printing data of structured languages such as XHTML or XHTML-Print are beginning to appear on the market.

In this regard, printers provided with functionality for printing the data of such structured languages have various printing capabilities for structured languages, and there is in fact no printer provided with the capability to completely and correctly analyze and print according to all the functions of XHTML or XHTML-Print determined in the standards. Currently it is true that the printable range (description) is set according to the printer manufacturer and the model within the range of the specifications set for each printer. Also, when giving consideration to device limitations, covering all the functions established in the standards is difficult due to restrictions by hardware resources such as that of the CPU and memory, and economic problems, and it is unavoidable that restrictions would occur for some functions. Furthermore, in terms of languages, it would be difficult to provide fonts for all languages and functional restrictions would occur such as being unable to carry out printing of print data that required an unloaded font. Consequently there is no guarantee that sending print data described in structured language to a printer will be printed correctly according to the intentions of the sender or content creator of the data. In such a printer, when printing cannot be carried out correctly due to restrictions on functions or errors in data analysis or the like, a common process is to carry out printing (best effort printing) using the functions considered to be the best among the functions of that printer. As an alternative process other than such best effort printing, there is also an option of not carrying out the actual printing when printing cannot be performed as intended.

The following technique has been proposed as a technique for countering these circumstances.

JP 2005-050299A describes receiving vCard or vNote data, analyzing the contents of the data before further processing to determine the suitability for printing, and if printing is not possible, giving notification of the cause of the error using a control panel or the like provided on the printer. Furthermore, JP 2005-031859A describes diverting information of a print order to another predetermined printer to shift processing if the execution of a print job following order information described in XML is not possible due to breakdown of the printer or the like. JP 2005-031859A also discloses responding with print error information to a client application at this time.

In these circumstances, a sender of print data cannot know what kind of print result will be obtained until printing is actually carried out and the print result thereof is viewed. Consequently, there is a problem that printing is carried out without obtaining printing that is expected and paper and ink are wasted.

And in addition to cases involving restrictions to ordinary capabilities, there are also cases in which the print data has parts that reference external image data and this image data may not be able to be referenced due to broken links or the like, thus resulting in imperfect printing. In these cases also, the person carrying out the printing may not be able to obtain the expected printing. As a result, there is a problem that paper and ink are wasted.

Furthermore, in a case that printing has been carried out on the basis of the best effort of the printer, there are times when the sender (user) of the print data cannot easily recognize from the print result the parts that could not be printed. In this way, the user himself sometimes may not even notice that there is a deficiency in the print result.

To prevent such problems, it is possible not to carry out the printing at all when a determination has been made before commencing printing that the printing cannot be executed properly. However, in these cases, it may be that even though the parts that cannot be printed are insignificant to the user who desires printing of that print data and the printing result thereof is sufficiently satisfactory, the printing itself is not carried out at all. Thus there is a problem that although it is possible to achieve printing that is satisfactory to the user, the printing itself cannot be carried out due to a trivial inconsistency in functionality.

On the other hand, in a case where printing could not be carried out correctly, the creator (user) of the print data content cannot determine what was the cause of the printing being incomplete. Thus, to create data that will be printed properly, it is necessary to perform trial and error repetitively.

In the techniques described in JP 2005-050299A and JP 2005-031859A, there is nothing that addresses the conditions in which printing itself is carried out but the printing becomes incomplete. Furthermore, there is nothing by which printability can be determined according to conditions of the printer and the intent of the user. Consequently, in a case where printing cannot be carried out according to the printing instructions due to data described in structured language, it is desirable that the user can clearly determine the cause and a part printed differently from print instruction, in a case that printing is carried out on a best effort basis.

SUMMARY OF THE INVENTION

An object of the present invention is to address the problems of the aforementioned conventional techniques.

It is an object of the present invention to provide a printing apparatus, a print control method, and a print system capable of executing printing that reflects a user's intention and offers greater convenience, in a case where unprintable data is present in print data described in structured language.

According to the present invention, there is provided a printing apparatus, comprising:

a reception unit configured to receive print data described in structured language from a host;

an analysis unit configured to analyze the print data received by the reception unit;

a determination unit configured to determine whether or not there is data of an unprintable part in the print data based on analysis by the analysis unit;

a print unit configured to carry out printing based on print data analyzed by the analysis unit; and a control unit configured to control printing by the print unit based on a determination result of the determination unit and print settings information that has been set for the print data.

According to the present invention, there is provided a print control method, comprising:

a reception step of receiving print data described in structured language from a host;

an analysis step of analyzing the print data received in the reception step;

a determination step of determining whether or not there is unprintable data in the print data based on analysis in the analysis step;

a print step of carrying out printing based on print data analyzed in the analysis step; and a control step of controlling printing in the print step based on the determination result in the determination step and the print settings information.

According to the present invention, there is provided a print system in which print data described in structured language is sent from a host to a printing apparatus for printing to be conducted, wherein the printing apparatus comprises:

an analysis unit configured to analyze the print data;

a determination unit configured to determine whether or not there is unprintable data in the print data based on analysis by the analysis unit;

a print unit configured to carry out printing based on print data analyzed by the analysis unit;

a control unit configured to control printing by the print unit based on a determination result of the determination unit and print settings information that has been set for the print data; and a transmission unit configured to transmit reply information to the host in response to control by the control unit, and wherein the host comprises:

a display unit configured to display information in response to the reply information transmitted by the transmission unit; and a print control unit configured to control printing by sending to the printing apparatus information for controlling printing in the printing apparatus in response to designation information inputted in response to information displayed on the display unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 depicts a view illustrating one example of XHTML print data that the transmitter according to the present embodiment transmits to the printer.

FIG. 7 depicts a view illustrating one example of status information that the printer according to the first embodiment transmits to the transmitter and in which is listed unprintable parts.

FIG. 8 depicts a view explaining one example of a condition table that is referenced by a condition determination unit of the printer according to the first embodiment.

FIG. 11 is a diagram for describing another example of the condition table according to the first embodiment.

FIG. 12 depicts a view illustrating one example of XHTML print data according to an embodiment different from the first embodiment.

FIG. 15 depicts a view explaining one example of a condition table according to the second embodiment.

DESCRIPTION OF THE EMBODIMENTS

Preferred embodiments of the present invention are described below in detail with reference to the accompanying drawings. It should be noted that the following embodiments do not limit the claims of the present invention, and not all combinations of features described in the embodiments are essential in solving means of the present invention.

First Embodiment

Figure 1:
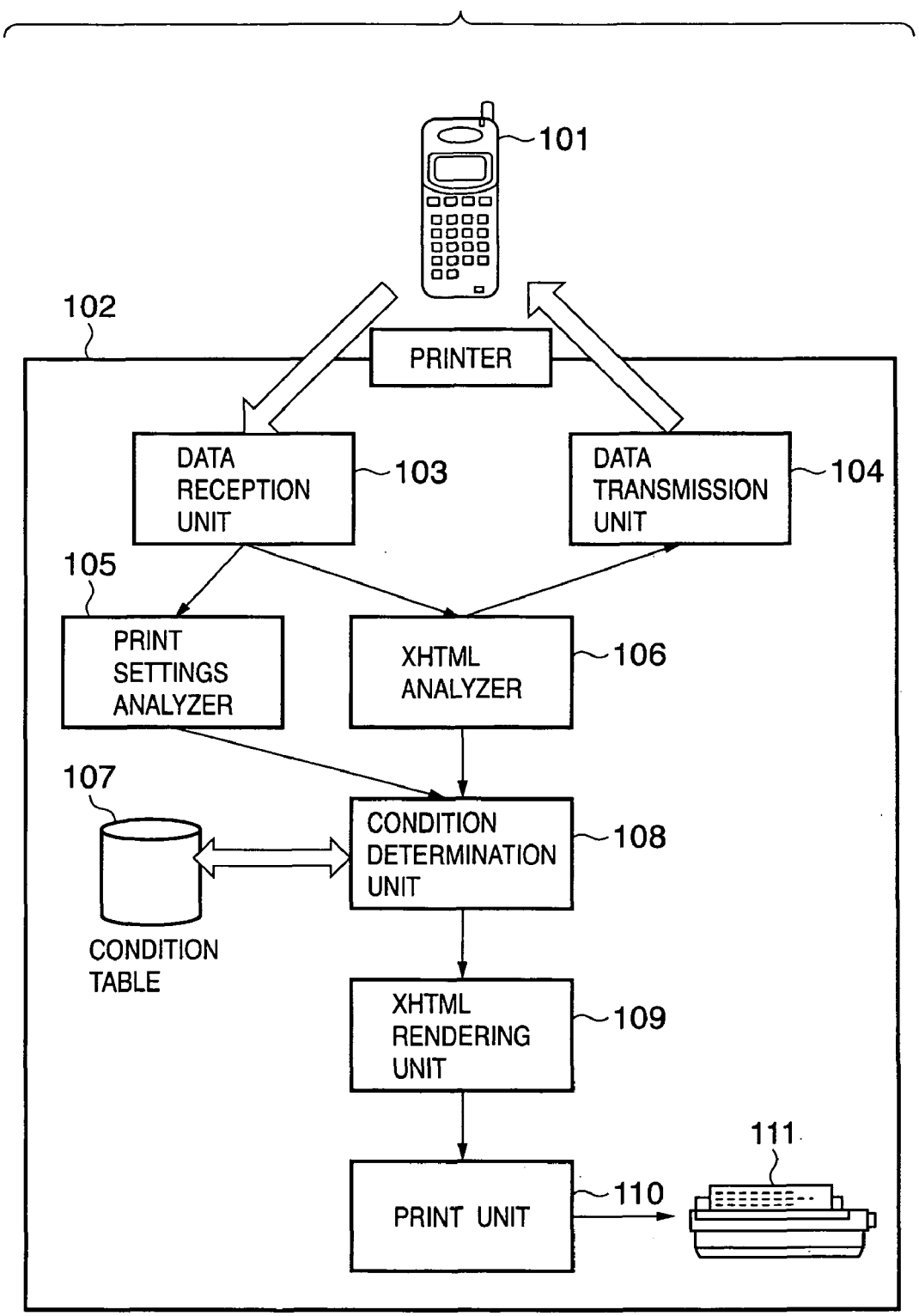
FIG. 1 is a functional block diagram for describing a functional configuration of a printing apparatus (printer) according to a first embodiment of the present invention.

FIG. 1 is a functional block diagram for describing a functional configuration of a printing apparatus (printer) according to a first embodiment of the present invention.

A printer 102 is configured so as to receive and print data from a transmitter (here, a cellular phone) 101 that sends out print data described in HTML, XHTML, XHTML-Print, or another structured language. The printer 102 is provided with a data reception unit 103 and a data transmission unit 104 that carry out wireless reception and transmission of data with the transmitter 101. If the data received by the data reception unit 103 has various settings (print quality, number of copies to be printed, paper settings, and the like) for printing, then the data is sent to a print settings analyzer 105. And if there is print data described in XHTML, then the data is sent to an XHTML analyzer 106. The XHTML analyzer 106 detects and lists parts contained in the received XHTML print data that are unprintable due to parsing errors, unsupported tags or properties, broken links to referenced data, or device limitations. A description of the errors detected here and print settings information that has been analyzed by the print settings analyzer 105 are sent to a condition determination unit 108.

The condition determination unit 108 compares and references a print condition table 107 that is determined in advance, and print settings information received from the print settings analyzer 105 and information concerning unprintability received from the XHTML analyzer 106, then determines whether or not printing is possible. If it determined as a result of this determination that printing is possible, the XHTML print data is sent to an XHTML rendering unit 109 for rendering. Thus-rendered image data is sent to a print unit 110 and the print data described in XHTML undergoes printing using a printer engine 111.

It should be noted that the structured language is described limited to XHTML in the above description, but this may be HTML, XHTML-Print, or another structured language. Furthermore, the transmitter 101 is not limited to a cellular phone and may be a personal computer (PC), a gaming device, a household electrical product, or a mobile device or the like.

Figure 2:
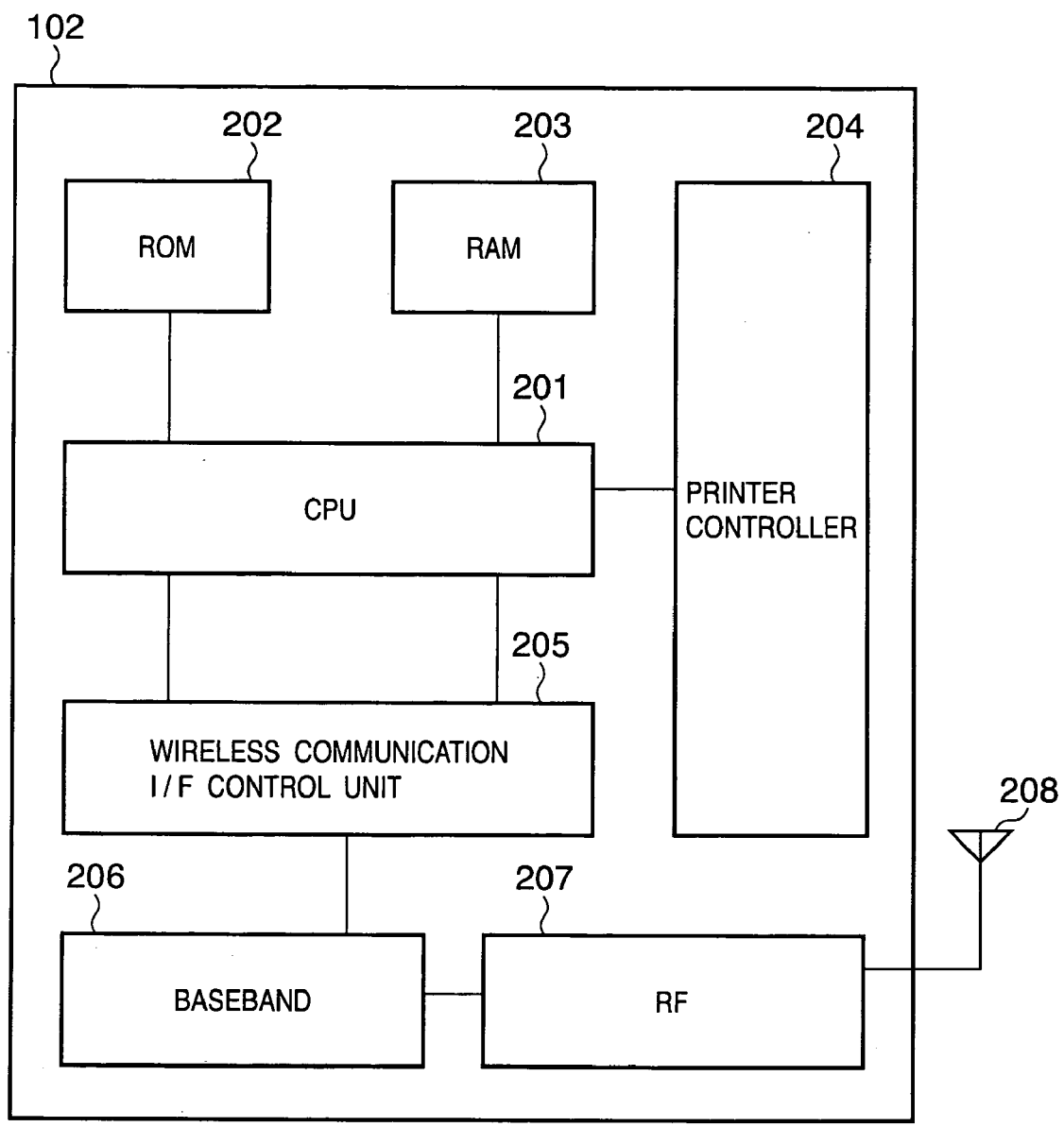
FIG. 2 is a block diagram showing an outline of a hardware configuration of a printer according to the present embodiment.

FIG. 2 is a block diagram showing an outline of a hardware configuration of the printer 102 according to the first embodiment.

The printer 102 is provided with a CPU 201 that controls all the printer operations according to a program stored in a ROM 202. The ROM 202 stores programs and various types of data. A RAM 203 functions as a work area for temporarily storing various types of data during control processing by the CPU 201. A printer controller 204 carries out control of the printer engine 111 according to instructions of the CPU 201. In the first embodiment, a wireless communication I/F unit 205, a baseband unit 206, an RF unit 207, and an antenna 208 control wireless communication using Bluetooth. When transmitting data from the printer 102 to the transmitter (cellular phone) 101, the data to be transmitted is forwarded from the wireless communication I/F unit 205 to the baseband unit 206 according to a format established by the Bluetooth standard. Then, the signals thereof are modulated by the RF unit 207 and transmitted from the antenna 208 to the Bluetooth transmitter (cellular phone) 101, which is a host. And when receiving data transmitted from the transmitter 101, a reverse route is taken to when transmitting data, such that signals sent from the antenna 208 to the RF unit 207 are demodulated and forwarded to the CPU 201 for processing via the baseband unit 206 and the wireless communication I/F unit 205.

Figure 3:
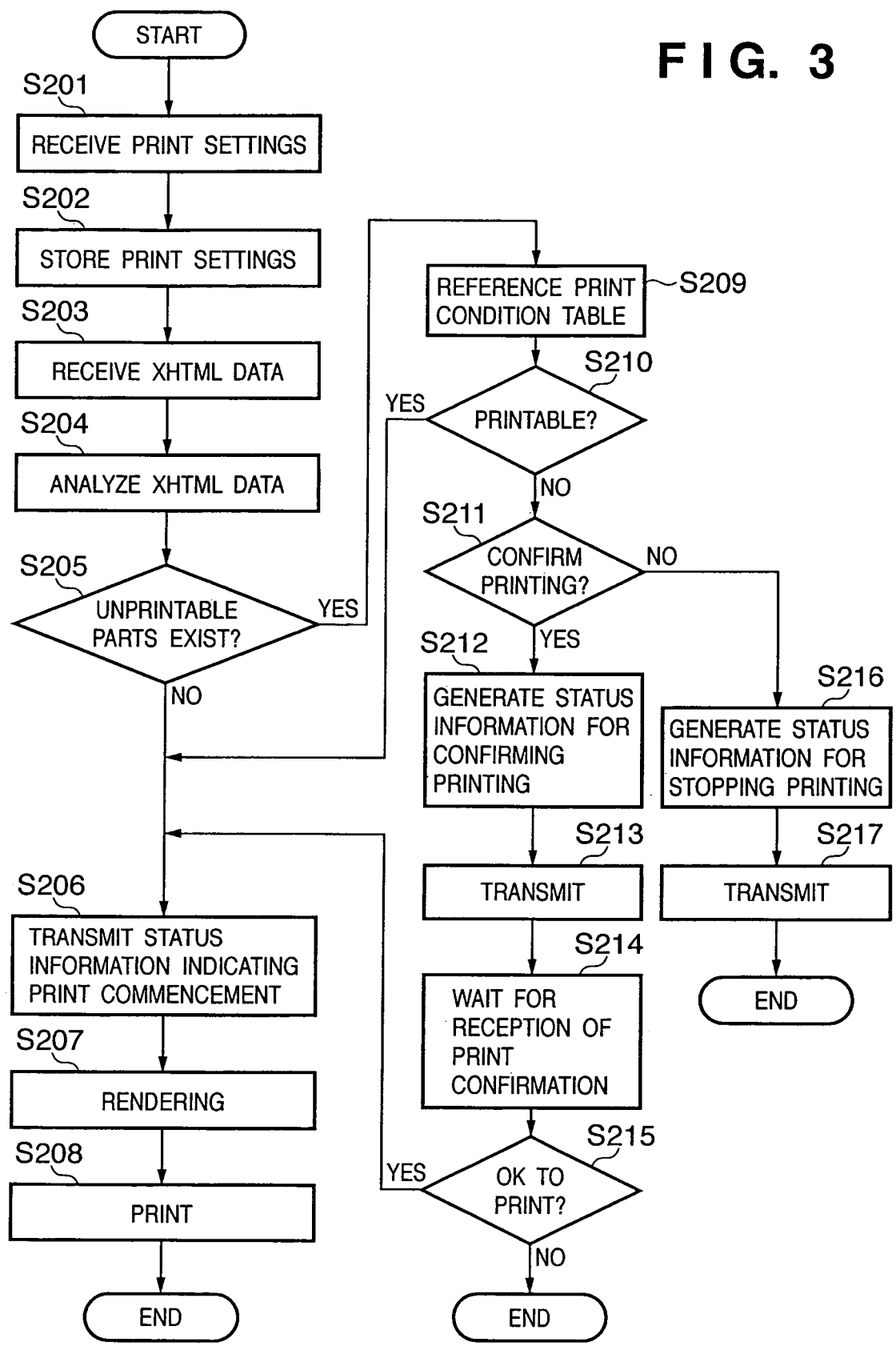
FIG. 3 is a flowchart for describing an operation, in a case that the printer according to the first embodiment receives print data from a transmitter.

FIG. 3 is a flowchart for describing an operation when the printer 102 according to the first embodiment receives print data from the transmitter 101. It should be noted that a program for executing this process is stored in the ROM 202 and executed under the control of the CPU 201.

First, at step S201, print settings information transmitted from the transmitter 101, concerning, for example, print quality, number of copies to be printed, and paper settings is received. Then, at step S202, the received print settings information is analyzed and stored in the RAM 203 (print settings analyzer 105). It should be noted that the print settings information may be set in advance in the printer 102 using keys, for example, on a control panel provided on the printer 102.

Next, at step S203, when XHTML print data is received from the transmitter 101, the procedure proceeds to step S204 where the print data is analyzed (XHTML analyzer 106).

Here, a determination is made as to whether or not there is any data of unprintable parts due to parsing errors, unsupported tags or properties, broken links to referenced data, or device limitations or the like, and if there are unprintable parts of data, these are listed. If the result of the analysis is that there is no unprintable part, the procedure proceeds from step S205 to step S206 where status information indicating print commencement is transmitted to the transmitter 101. Then, at step S207, the XHTML data undergoes rendering as an ordinary print process (XHTML rendering unit 109) and at step S208, printing is carried out by the print unit 110 and the printer engine 111 based on the rendering result.

On the other hand, if there is data of any unprintable part in the print data at step S205, the procedure proceeds to step S209 where the print settings information stored at step S202 is analyzed by the print settings analyzer 105. Then, the print condition table 107 is referenced by the condition determination unit 108 using the analysis results as a reference index. The print condition table 107 holds print conditions, for example, when in high quality print mode or there is little ink remaining, cancel printing if there is data of unprintable parts, or when in normal, test, or low quality print mode, carry out printing even if there is data of unprintable parts. Next, at step S210, a reference result of the print condition table 107 and information of the data of unprintable parts that has been detected are compared, and if there is a printable condition the procedure proceeds to step S206 where status information indicating print commencement is transmitted to the transmitter 101. In this case, at step S207, the data of unprintable parts is ignored and the XHTML data undergoes rendering, and the result of this rendering is printed (S208). It should be noted that here data of unprintable parts is ignored and rendering is carried out, but instead of this it is also possible to perform processing so that a printing result is obtainable indicating with a framed border or the like to the effect that there are unprintable parts.

On the other hand, if there is an unprintable condition at step S210, the procedure proceeds to step S211 where a determination is made using the reference results of the print condition table 107 as to whether or not "confirm printing" is a condition. If there is, the procedure proceeds to step S212 where information of the unprintable parts is generated as status information for confirming printing to the transmitter 101. Next, at step S213, the status information is transmitted to the transmitter 101. Then, at step S214, the procedure waits for reception of data for confirming printing from the transmitter 101. Here, when data indicating "OK to print" is received, the procedure proceeds to step S206 where status information indicating print commencement is sent, then at step S207, unprintable parts are ignored and the XHTML data undergoes rendering, and the result of this rendering is printed (S208). On the other hand, when data indicating "not OK to print" is received at step S215, the XHTML print data is discarded and processing finishes without carrying out printing.

Furthermore, when the reference result of the print condition table 107 is that there is a "stop printing" condition at step S211, the procedure proceeds to step S216 where information of the unprintable parts is generated as status information indicating for printing to be stopped to the transmitter 101. Then, at step S217, this is transmitted to the transmitter 101. Then, the XHTML print data received at step S203 is discarded and processing finishes without carrying out printing.

It should be noted that specific examples are given below for detailed description of the determination processes based on the reference result of the print condition table 107 in steps S209 to S211.

Figure 4:
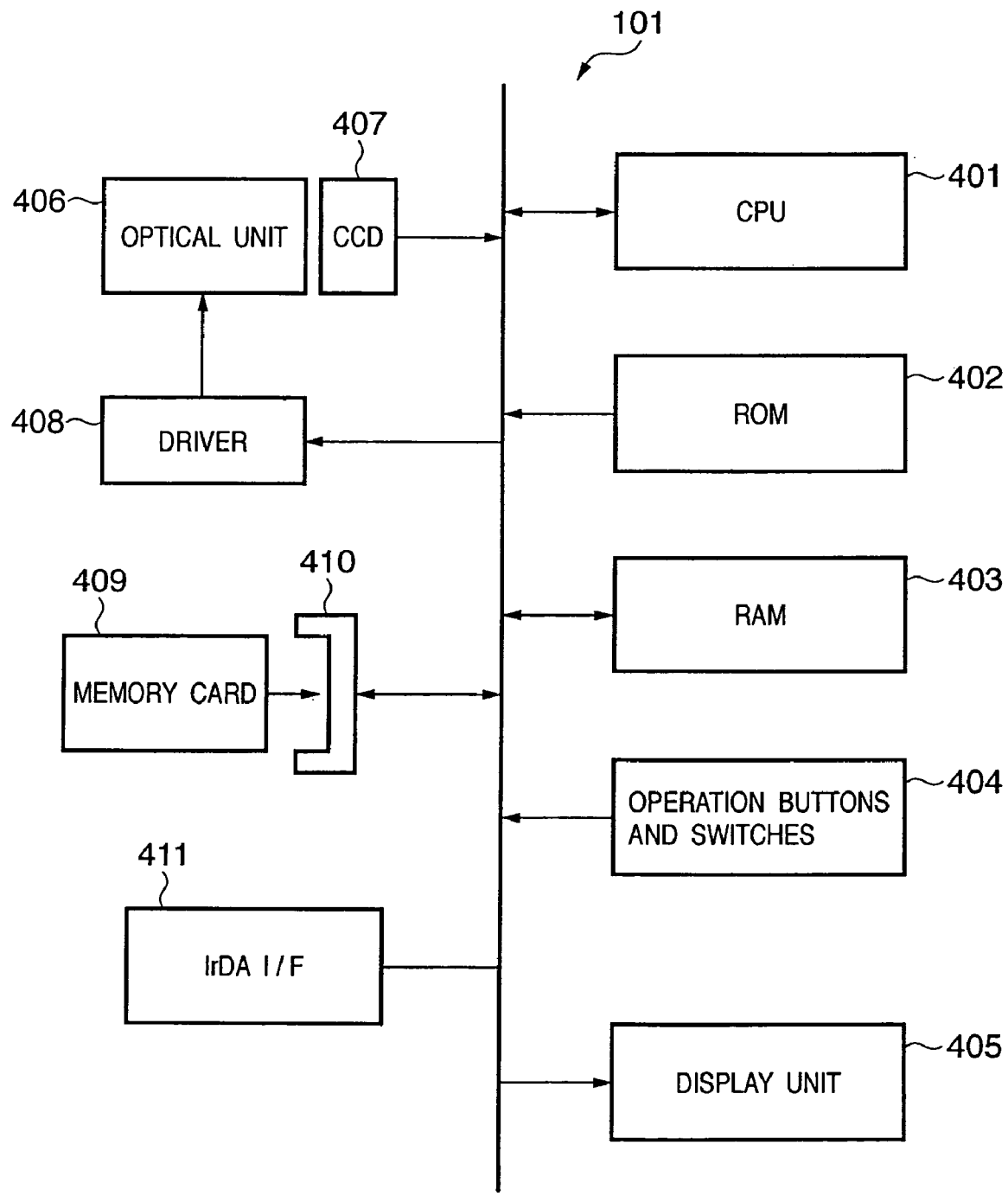
FIG. 4 is a block diagram for describing a configuration of principal components related to control of a cellular phone, which is the transmitter according to the first embodiment of the present invention.

FIG. 4 is a block diagram for describing a configuration of principal components related to control of a cellular phone, which is the transmitter 101 according to the first embodiment of the present invention.

A CPU 401 manages all the control of a cellular phone 101. A ROM 402 stores programs and various types of data for executing processing procedures executed by the CPU 401. Here, assuming that the programs are upgraded as appropriate, it is also possible to use a writable nonvolatile memory, for example a flash memory, for the ROM 402. A RAM 403 is used as a work area when processing is executed by the CPU 401, and temporarily stores various types of data. The RAM 403 may be configured as an ordinary volatile memory or may be configured as a nonvolatile memory that holds its content even when its power source is turned off. A CCD 407 produces electrical signals corresponding to an image focused on the surface of its elements by an optical unit 406. A driver 408 controls the focusing and aperture of the optical unit 406 under the control of the CPU 401. A memory card 409 stores image data and the like of captured images, and is usually a compact flash (registered trademark) memory card or a smart media or the like.

An infrared transceiver unit (IrDA) 411 carries out infrared transceiving for infrared communications based on Bluetooth or the like. In addition to carrying out infrared transceiving with the printer 102, the infrared transceiver unit 411 is capable of infrared transceiving with other cellular phones and infrared transceiving with electronic devices having remote control light receiving units such as TVs. A liquid crystal display unit 405 displays various types of information when used in a cellular phone. Moreover, when used with a camera function, it is capable of displaying images as a finder as well as displaying taken photos and the like. Operation buttons and switches 404 are used for composing email messages as well as for dialing operations when used in a cellular phone. Furthermore, when used in a camera function, these may enable camera operations such as those for the shutter. It should be noted that functions of the operation buttons and switches 404 vary greatly according to the specifications and conditions of the cellular phone 101. A card slot 410 is a memory card slot for connecting the memory card 409 and by using the memory card 409 it is possible to save/browse captured images as well as save and browse through various types of information in the cellular phone 101.

Figure 5:
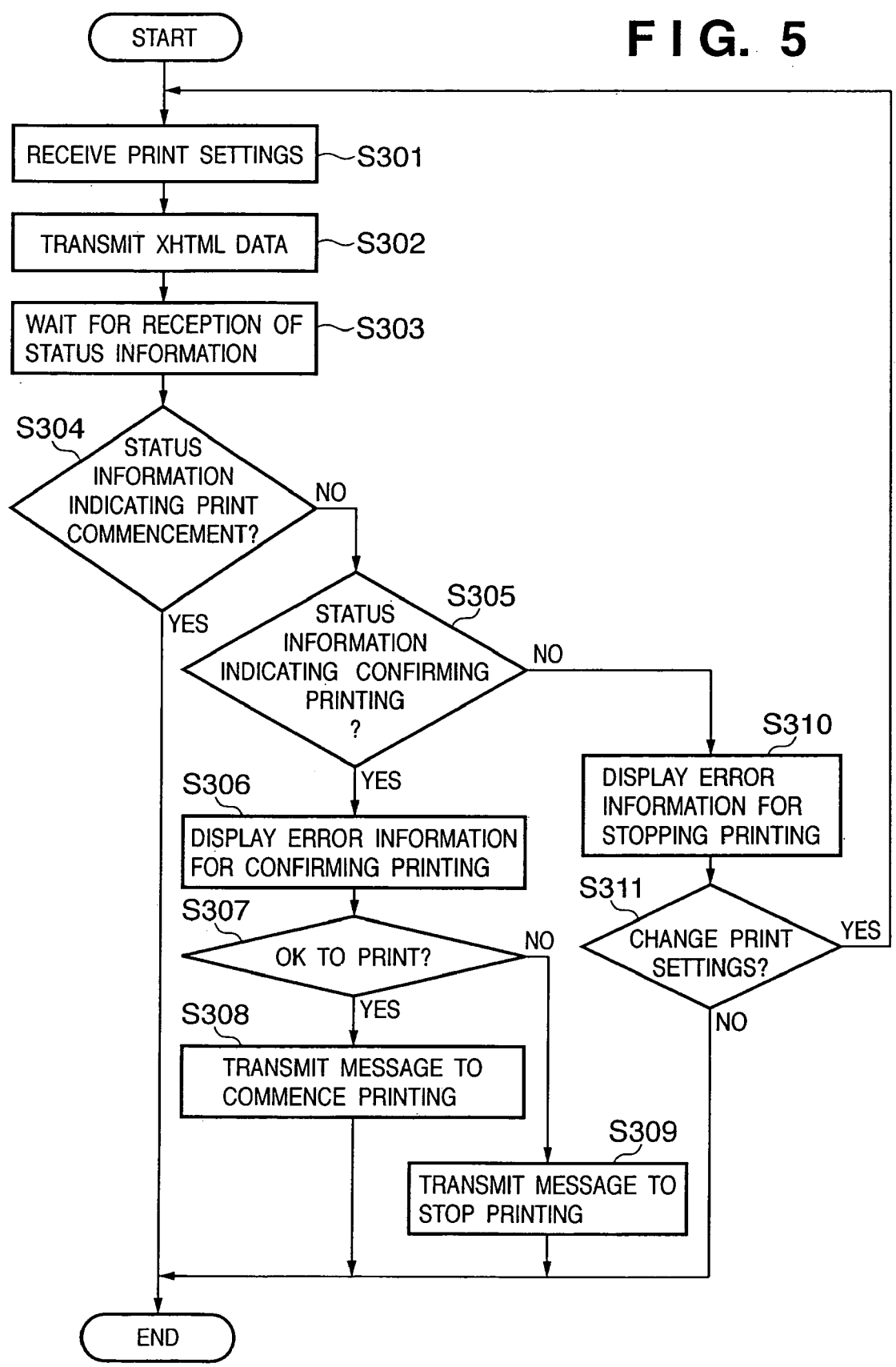
FIG. 5 is a flowchart for describing an operation, in a case that the transmitter according to the first embodiment requests printing to the printer.

FIG. 5 is a flowchart for explaining an operation in a case that the transmitter (cellular phone) 101 according to the first embodiment requests printing to the printer 102. It should be noted that a program for executing this process is stored in the ROM 402 and executed under the control of the CPU 401.

First, at step S301, print settings information such as print quality, number of copies to be printed, and paper settings are transmitted all at once to the printer 102. It should be noted that the flow for the print settings information here is one of being transmitted from the transmitter 101, but it is also possible as mentioned above to set these in advance in the printer 102 using different means such as keys provided on the printer 102.

After the print settings information has been transmitted, XHTML print data is transmitted to the printer 102 at step S302. Then, at step S303, the procedure waits for reception of status information from the printer 102. Then, when the procedure is waiting for reception of status information indicating print commencement from the printer 102, if the status information indicating print commencement is received at step S304, a transition is made to an ordinary possess such waiting for completion of printing.

On the other hand, when status information indicating print commencement is not received from the printer 102 at step S304, the procedure proceeds to step S305 to see whether or not status information indicating waiting for "confirm printing" is received in which data of unprintable parts is listed. If the status information is received, then the procedure proceeds to step S306 where a message for "confirm printing" is displayed (see FIG. 9) on the display unit 405 provided on the transmitter 101. Then, at step S307, it is confirmed with a user as to whether or not to carry out printing. Here, if the user operates the operation button 404 to input an instruction to carry out printing, the procedure proceeds to step S308 where a print commencement message indicating print commencement (OK to print) is transmitted to the printer 102.

On the other hand, if at step S307 the user instructs that printing is not to be carried out, the procedure proceeds to step S309, where a stop printing message indicating that it is not OK to print is transmitted to the printer 102.

On the other hand, if at step S305 the transmitter 101 receives status information indicating to "stop printing," the procedure proceeds to step S310 where a message is displayed on the display unit 405 for confirming with the user whether or not to change print settings such as the print quality, number of copies to be printed, and paper settings and resend the print data. Then, if an instruction is given to change the print settings at step S311, the procedure returns to step S301, and print settings by the user are received, and processing for transmitting the print settings information and the followings are repeated. Furthermore, if the print settings are not to be changed at step S311, then print processing finishes as it is.

An example of the above-mentioned processing using the printer 102 according to the first embodiment is described in detail with reference to FIGS. 6 to 8.

FIG. 6 depicts a view for illustrating one example of XHTML print data that the transmitter 101 of the first embodiment transmits to the printer 102.

Suppose that, of the XHTML print data shown in FIG. 6, the printer 102 does not support the properties indicated by the numeral 601. The XHTML analyzer 106 of the printer 102 that has received this XHTML print data makes a determination at step S205 in FIG. 3 that the "clipit" class using these properties cannot be printed properly. Here, the parts of the body data indicated by the numeral 602 is determined to be a part that cannot be printed properly.

FIG. 7 depicts a view for illustrating one example of status information that the printer 102 of the first embodiment transmits to the transmitter 101 and in which is listed unprintable parts.

Numeral 701 indicates that the properties corresponding to the numeral 601 in FIG. 6 cannot be analyzed. Furthermore, numeral 702 indicates that the part of body data shown by the numeral 602 in FIG. 6 cannot be printed properly.

Furthermore, FIG. 8 depicts a view for explaining one example of the print condition table 107 that is referenced by the condition determination unit 108 of the printer 102 according to the present embodiment.

Here it is assumed that printing of "normal printing, plain paper, number of copies to be printed=1" is set in advance in step S201 of FIG. 3 as the print settings. Here, if the printer 102 detects unprintable parts from the received XHTML print data, the print condition table 107 shown in FIG. 8 is referenced at step S209. Here, the unprintable part 602 of the print data shown in FIG. 6 is taken as a normal error and that column is referenced. As indicated by numeral 801, a result is "Print when number of errors=1, confirm printing when number of errors≧2." In the data shown in FIG. 6, there is only the single unprintable part 602 and therefore the number of errors=1. Thus, in this case, this corresponds to "Print when number of errors=1" indicated by the numeral 801 in FIG. 8. Consequently, it is determined that printing is possible at step S210 of FIG. 3. In this case, the printer 102 carries out printing ignoring the unprintable part without transmitting error information to the transmitter 101.

As another example it is assumed that printing of "high quality printing, plain paper, number of copies to be printed=1" is set as the print settings. The column referenced here is shown by numeral 802 in FIG. 8, which is "confirm printing when there is an error." Consequently a determination is made at step S211 that "confirm printing" is necessary and the procedure proceeds to step S212, such that status information for confirming printing as shown in FIG. 7 is generated and this is transmitted to the transmitter 101 at step S213. Here, the line numbers in the XHTML data in which properties contained in the properties 601 of FIG. 6 are present, and property tokens are summarized in the "part that cannot be analyzed properly" 701 as the error details. As a result, the part that cannot be printed is summarized in the "part that cannot be printed properly" 702. At step S306 of FIG. 5, the transmitter 101 that has received this data can display a message for confirming printing to the user as shown in the display example of FIG. 9.

Figure 9:
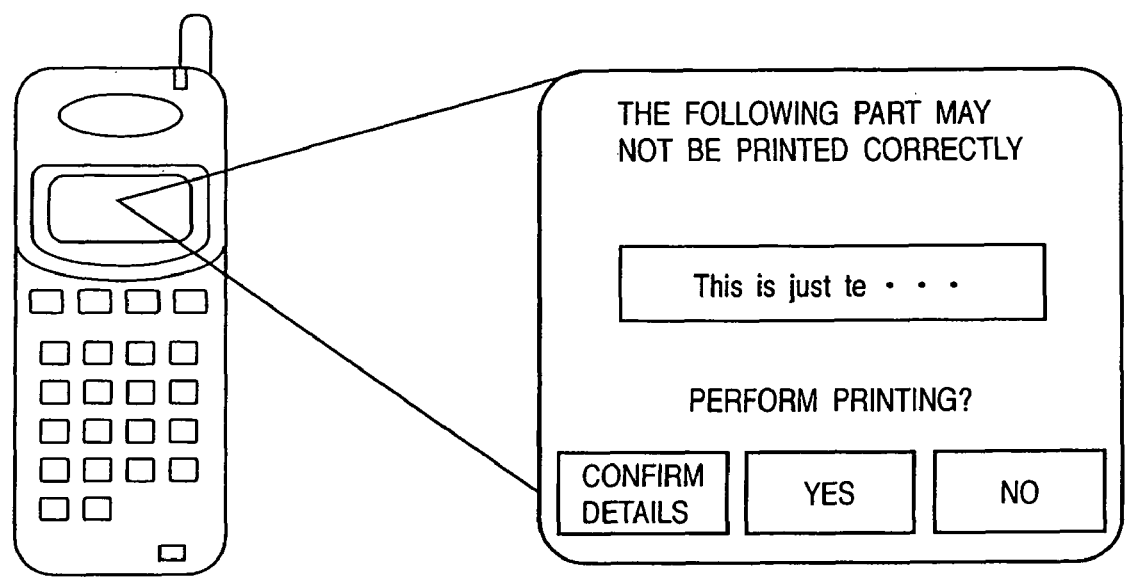
FIG. 9 is a diagram for describing an example of a printing confirmation message displayed on a display unit of the cellular phone, which is the transmitter according to the first embodiment.

FIG. 9 is a diagram for describing an example of a printing confirmation message displayed on the display unit 405 of the cellular phone, which is the transmitter 101 according to the first embodiment.

In the example of FIG. 9, a message saying "the following part may not be printed correctly" is displayed along with a text part that cannot be printed properly "This is just some te< . . . " Further still, a message for "confirm printing" is displayed, namely boxes labeled "confirm details," "yes," and "no" querying whether or not printing is to be carried out. Then, when one of these boxes is selected using operation button 404 by the user, it is accordingly determined whether or not printing is to be executed.

Furthermore, when "high quality printing, high quality paper, number of copies to be printed=1" is set as the print settings, the result of referencing at step S209 is "error, stop printing" as indicated by numeral 803 of FIG. 8. Thus, in this case, a determination is made at step S211 to "stop printing." Then, the procedure proceeds to step S216, where status information for stopping printing is generated and transmitted to the transmitter 101. When the transmitter 101 receives this data, the procedure proceeds from step S305 to step S310, where a message for changing print settings can be displayed to the user as shown in the display example of FIG. 10.

Figure 10:
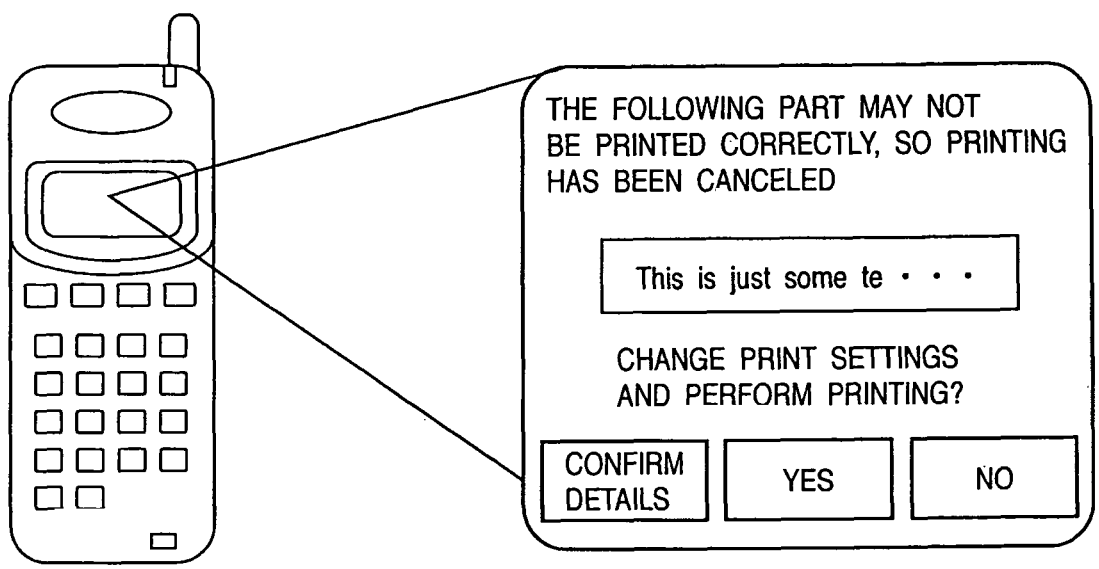
FIG. 10 is a diagram for describing an example of a printing cancellation confirmation message displayed on the display unit of the cellular phone, which is the transmitter according to the first embodiment.

FIG. 10 is a diagram for describing an example of a stop printing confirmation message displayed on the display unit 405 of the cellular phone, which is the transmitter 101 according to the first embodiment.

In the example of FIG. 10, a message saying "the following part may not be printed correctly, so printing has been canceled" is displayed along with a text part that cannot be printed properly "This is just some te . . . " Further still, boxes labeled "confirm details," "yes," and "no" are displayed to query whether or not the print settings are to be changed for printing to be carried out. Then, according to the selection of the user, it is determined whether or not the print settings are to be changed and printing to be carried out.

It should be noted that in the example of the print condition table 107 shown in FIG. 8, a single unprintable part is taken as a single error and a basis of the determination was the number of errors. In contrast to this, it is also possible to make a determination on a basis of the proportion of a region that is unprintable as shown in another example of the print condition table 107 of FIG. 11.

FIG. 11 is a diagram for describing another embodiment of the print condition table 107 according to the foregoing first embodiment.

As is evident when compared with FIG. 8, a field 1100 of FIG. 11 is set such that when printing "normal printing" with "plain paper," printing is executed as normal as it is if the proportion of unprintable regions is less than 2%, and when this is equal or more than 2%, a "confirm printing" is carried out.

It should be noted that a method for calculating the regions here is by estimating a pixel surface area of a region that is unprintable and calculating the proportion of unprintable regions based on the pixel surface area of the entire page to be printed. Alternatively, a method is conceivable of totaling the number of characters contained in the unprintable region and calculating the proportion of unprintable regions based on the total number of characters.

Next, a modified example of the first embodiment of the present invention is described in detail with reference to FIG. 8 and FIG. 12. It should be noted that the configurations of the printer 102 and the transmitter 101 are the same in this modified example as those in the first embodiment.

FIG. 12 depicts a view illustrating one example of XHTML print data according to a modified example of the first embodiment of the present invention.

Here, the printer 102 cannot trace the link indicated by "unobtainable image" 1201 that references an image. This is conceivable for the link either when it is interpreted that the link cannot be statically traced from the URL or the like that is displayed, or when a determination is made that the link is untraceable due to conditions of the link at the time of referencing the link.

Here, it is assumed that print conditions of "normal printing, plain paper, number of copies to be printed=1" are set as the print settings. When referencing an example of the condition table of FIG. 8 here, in the case of a normal error, this becomes, "Print when number of errors=1, confirm printing when number of errors≧2." However, in the case of the print data of FIG. 12, all the unprintable parts are only images. Accordingly, in a case that the image error column corresponding to the print conditions of "normal printing, plain paper, number of copies to be printed=1" of FIG. 8 is referenced, "printing" is given as indicated by numeral 804. As a result, a determination is made at step S210 that printing is possible.

For another example it is assumed that "high quality printing, plain paper, number of copies to be printed=1" are the print settings. When referencing the print condition table 107 of FIG. 8 this time, this becomes "Confirm printing when there is an error" in the case of an image error in the same manner as for numeral 802. Therefore, a determination is made at step S211 to "confirm printing."

It should be noted that in the above-described first embodiment, the printing confirmation was carried out by the user at the transmitter 101, but there is no limitation to this in the present invention, and the printing confirmation may also be carried out by the user using a display device and an input device provided in the printer 102. Furthermore, error information is displayed not only at the transmitter 101 but error information may also be displayed at a display unit provided in the printer 102.

With the above-described first embodiment, when a situation occurs in which a printer is unable to print XHTML data contained in print data, a determination can be made as to whether to print or to confirm printing, or to stop printing according to print conditions that are set at that point.

Furthermore, in a case where there are parts that will not be printed properly, the user who has given the instruction for printing can give the instruction for printing after confirming such parts in advance and therefore can easily distinguish which printed parts have not been printed properly.

Second Embodiment

A second embodiment of the present invention is described next. It should be noted that the hardware configuration of a printer 1102 according to the second embodiment is the same as the configuration (FIG. 2) in the above-described first embodiment and therefore description thereof is omitted.

Figure 13:
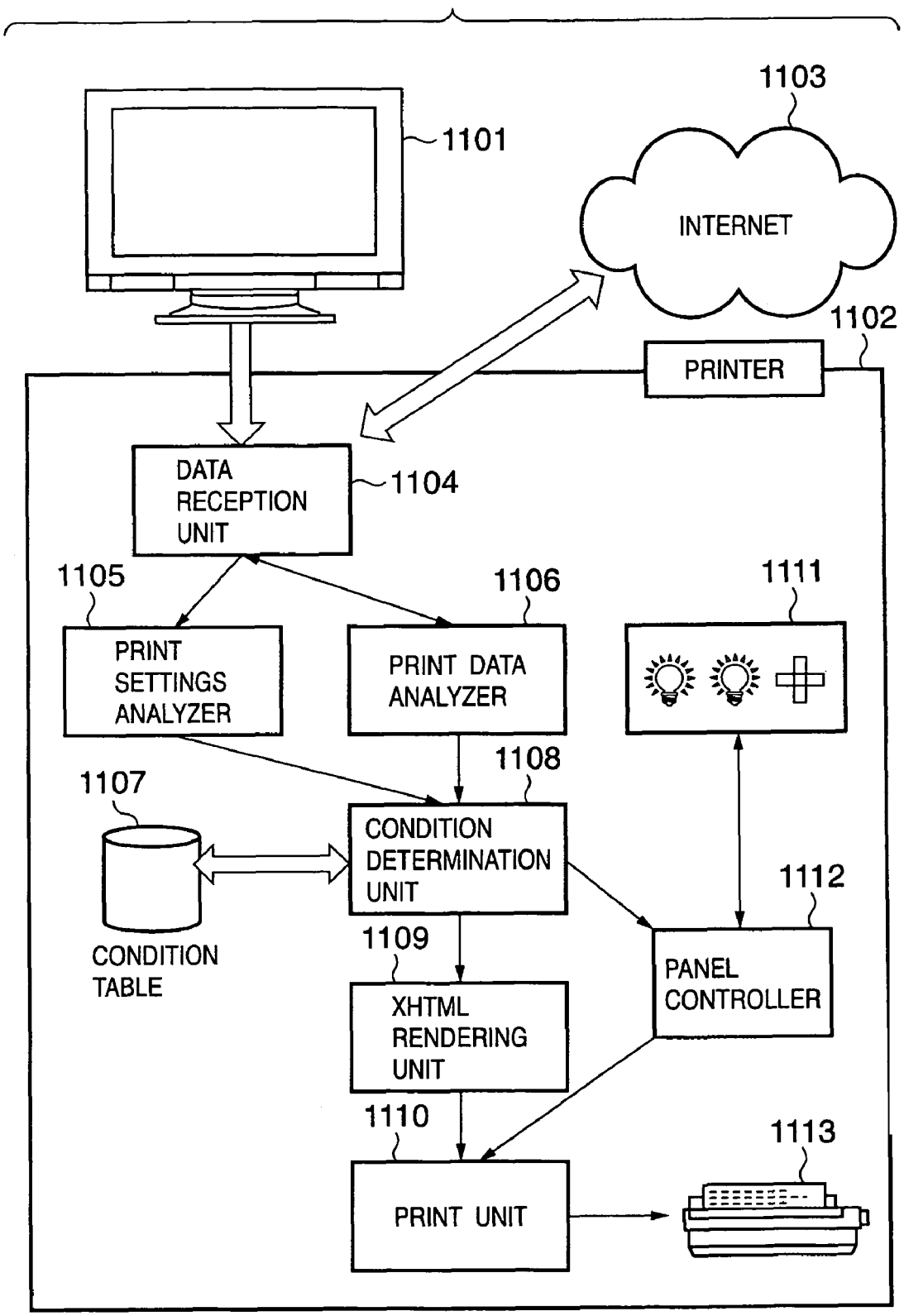
FIG. 13 is a functional block diagram for describing an outline of a functional configuration of a printer according to a second embodiment of the present invention.

FIG. 13 is a functional block diagram for describing an outline of a functional configuration of the printer 1102 according to the second embodiment of the present invention.

The printer 1102 operates upon receiving data from a transmitter 1101 that sends out print data described in HTML, XHTML, XHTML-Print, or another structured language. The printer 1102 is provided with a data reception unit 1104 for carrying out reception of data from the transmitter 1101. Furthermore, the data reception unit 1104 is connected to an internet 1103 and is capable of receiving print data from the internet 1103. It should be noted that in the second embodiment, the transmitter 1101 is a television receiver.

If the data received by the data reception unit 1104 has various settings information (print quality, number of copies to be printed, or paper settings and the like) for printing, then the data is sent to a print settings analyzer 1105. Furthermore, if the data is print data, then it is sent to a print data analyzer 1106. Here, if the print data requests to carry out printing by receiving data on the internet 1103, then the print data analyzer 1106 instructs the data reception unit 1104 to receive print data from the internet 1103.

If the print data that is finally received is print data described in XHTML, then that data is reanalyzed by the print data analyzer 1106. In this analysis, parts contained in the received XHTML print data that are unprintable due to parsing errors, unsupported tags or properties, broken links to referenced data, or device limitations and the like are detected and listed. A description of the errors detected here and print settings that have been analyzed by the print settings analyzer 1105 are sent to a condition determination unit 1108. The condition determination unit 1108 compares and references a print condition table 1107 that is determined in advance, and print settings received from the print settings analyzer 1105 and information concerning unprintability received from the print data analyzer 1106, then determines whether or not printing is possible. If it determined as a result of this determination that printing is possible, the XHTML print data is sent to an XHTML rendering unit 1109 and the XHTML print data is printed by a print unit 1110 using a printer engine 1113.

A panel controller 1112 is used for controlling a display unit such as an LED provided on a console unit 1111 and for receiving button input or the like using a key or button provided on the console unit 1111 and confirming instructions from a user during printing of a reason for stopping printing, for example.

It should be noted that in the foregoing description, the structured language is limited to XHTML for describing the present embodiment, but this may be HTML, XHTML-Print, or another structured language.

Figure 14:
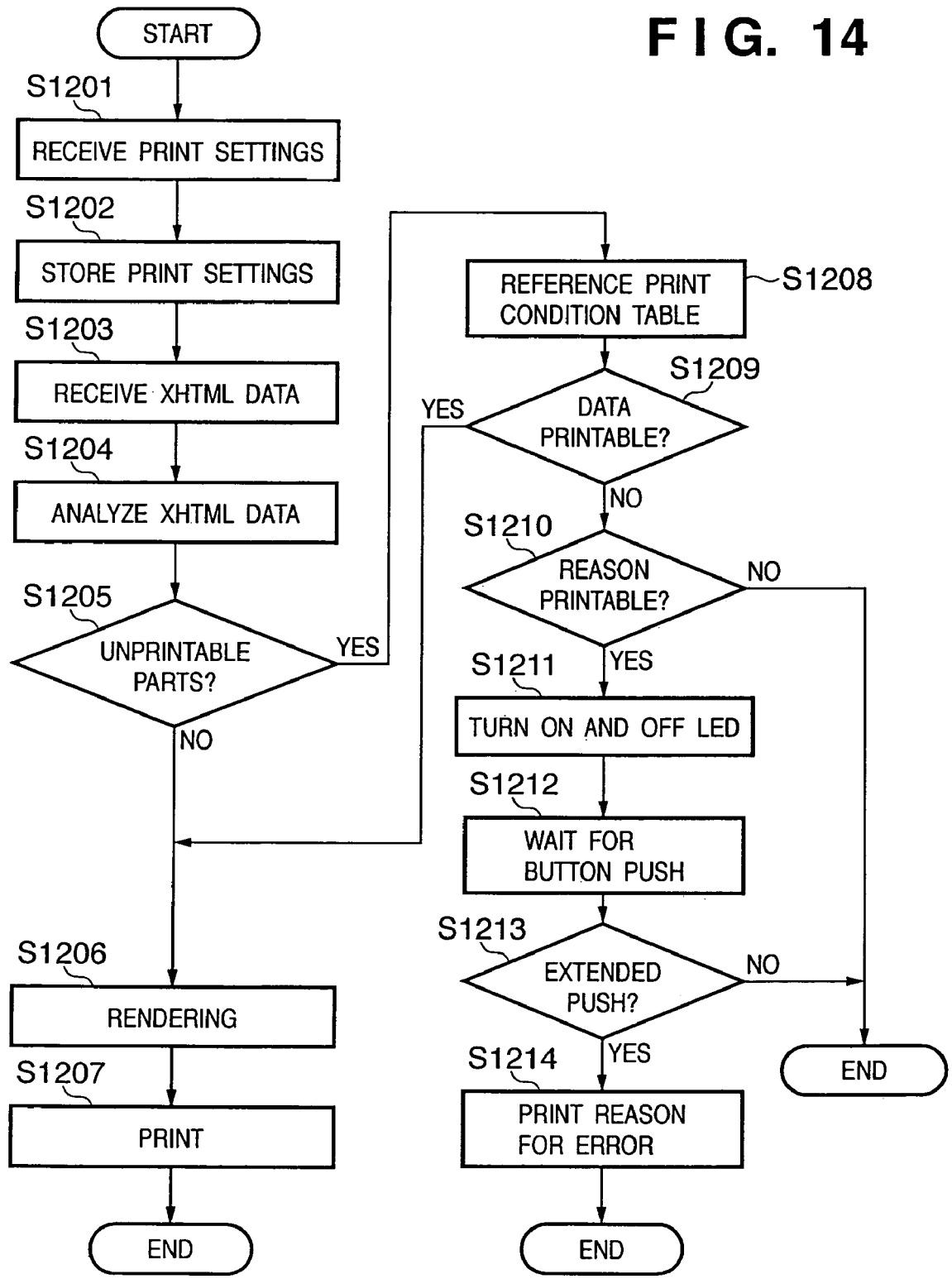
FIG. 14 is a flowchart for describing processing of a printer according to the second embodiment.

FIG. 14 is a flowchart for describing processing of the printer 1102 according to the second embodiment. It should be noted that a program for executing this process is stored in the ROM 202 and executed under the control of the CPU 201.

First, at step S1201, print settings information such as print quality, number of copies to be printed, and paper settings is received from the transmitter 1101. Next, at step S1202, the print settings information is stored in the RAM 203. It should be noted that the print settings information here is received from the transmitter 1101, but it is also possible to set this in advance using, for example, the console unit 1111 of the printer 1102.

Next, at step S1203, when print data (XHTML data) is received from the transmitter 1101, the print data analyzer 1106 analyzes whether or not that data requires data from the internet 1103. Then, if necessary, the data reception unit 1104 receives print data from the internet 1103. When reception of XHTML print data is finished in this manner, the procedure proceeds to step S1204 where this print data is analyzed. Here, an examination is conducted as to whether or not there are unprintable parts due to parsing errors, unsupported tags or properties, broken links to referenced data, or device limitations or the like, and if there are unprintable parts, these are listed. If a result of the analysis is that there is no unprintable part, the procedure proceeds from step S1205 to step S1206 where rendering of the XHTML data is carried out as an ordinary print process. Then, at step S1207, printing is carried out based on the result of the rendering.

On the other hand, if it is determined at step S1205 that there is any unprintable part in the print data, the procedure proceeds to step S1208 where the print condition table 1107 is referenced using, as a reference index, the print settings information stored at step S1202. Here, the result of referencing the print condition table 1107 and the information of detected unprintable parts are compared and a determination is made as to whether or not there is a printable condition. If the determination in step S1209 is that printing is possible, the procedure proceeds to step S1206 where any unprintable part is ignored and the XHTML data undergoes rendering, and the result of this rendering is printed (S1207). It should be noted here that unprintable parts are ignored and rendering is carried out, but instead of this it is also possible to perform processing so that printed matter is printed indicating the unprintable parts with a framed border or the like.

On the other hand, if a determination is made at step S1209 that printing is not possible due to a result of referencing the print condition table 1107, then the procedure proceeds to step S1210 where an examination is made as to whether or not there is a condition of "printing of data stopped, possible to print reason." If there is, the procedure proceeds to step S1211 where the LED provided on the console unit 1111 is caused to turn on and off. In this manner, it is notified to the user that the reason for stopping printing can be printed with the printer 1102. Next, the procedure proceeds to step S1212 where the procedure waits for the user to press a button provided on the console unit 1111 that is set in advance. Here, when the button is pressed for an extended time period, it is determined that instruction has been given for printing of the reason for stopping printing and the procedure proceeds from step S1213 to step S1214 where the reason for stopping printing is printed. On the other hand, when the button is pressed for a short time period at step S1213, processing finishes by discarding the received XHTML print data without printing the reason for stopping printing.

Furthermore, if a result of referencing the print condition table 1107 at step S1210 is that there is a condition of "printing stopped, cannot print reason," then processing finishes by discarding the XHTML print data without printing the reason for not printing.

Next, a specific example of a process with the printer 1102 of the second embodiment is described in detail with reference to the XHTML data of FIG. 6 and the print condition table 1107 of FIG. 15.

The above-mentioned FIG. 6 shows one example of XHTML print data that the transmitter 1101 transmits to the printer 1102.

FIG. 15 depicts a view illustrating one example of the print condition table 1107 according to the second embodiment.

Suppose that, in the example of the XHTML print data shown in FIG. 6, the printer 1102 does not support the properties indicated by the numeral 601. Having received this XHTML print data, the print data analyzer 1106 of the printer 1102 makes a determination at steps S1204 and S1205 in FIG. 14 that the "clipit" class using these properties cannot be printed properly. Furthermore, the "part that cannot be printed properly" 602 of the body data is determined to be the part that cannot be printed properly.

Here it is assumed that printing conditions of "draft printing, plain paper" are set in advance in step S1201 as the print settings. The printer 1102 detects here that unprintable parts from the XHTML print data, and therefore the print condition table 1107 shown in FIG. 15 is referenced at step S1208. Then, in a case that the unprintable part 602 of the data shown in FIG. 6 is taken as a normal error and that column is referenced, this corresponds to "printing possible" indicated by numeral 1501. Therefore, a determination is made at step S1209 that printing is possible. Consequently, with this print settings, the unprintable parts are ignored and the XHTML data is printed in steps S1206 and S1207.

For another example it is assumed that "normal printing, plain paper" is set as the print settings. In this case, the result of referencing the print condition table 1107 in step S1208 is that "printing of data stopped, possible to print reason" applies as indicated by numeral 1502. Consequently, the process proceeds from step S1209 to step S1210, it is determined at step S1210 that it is possible to print the reason for stopping printing. Thus the printer 1102 causes the LED to turn on and off in step S1211, then at step S1213 if it can be confirmed that a button set in advance is pressed for an extended time period, the reason for stopping printing is printed as shown in FIG. 16 (Step S1214).

Figure 16:
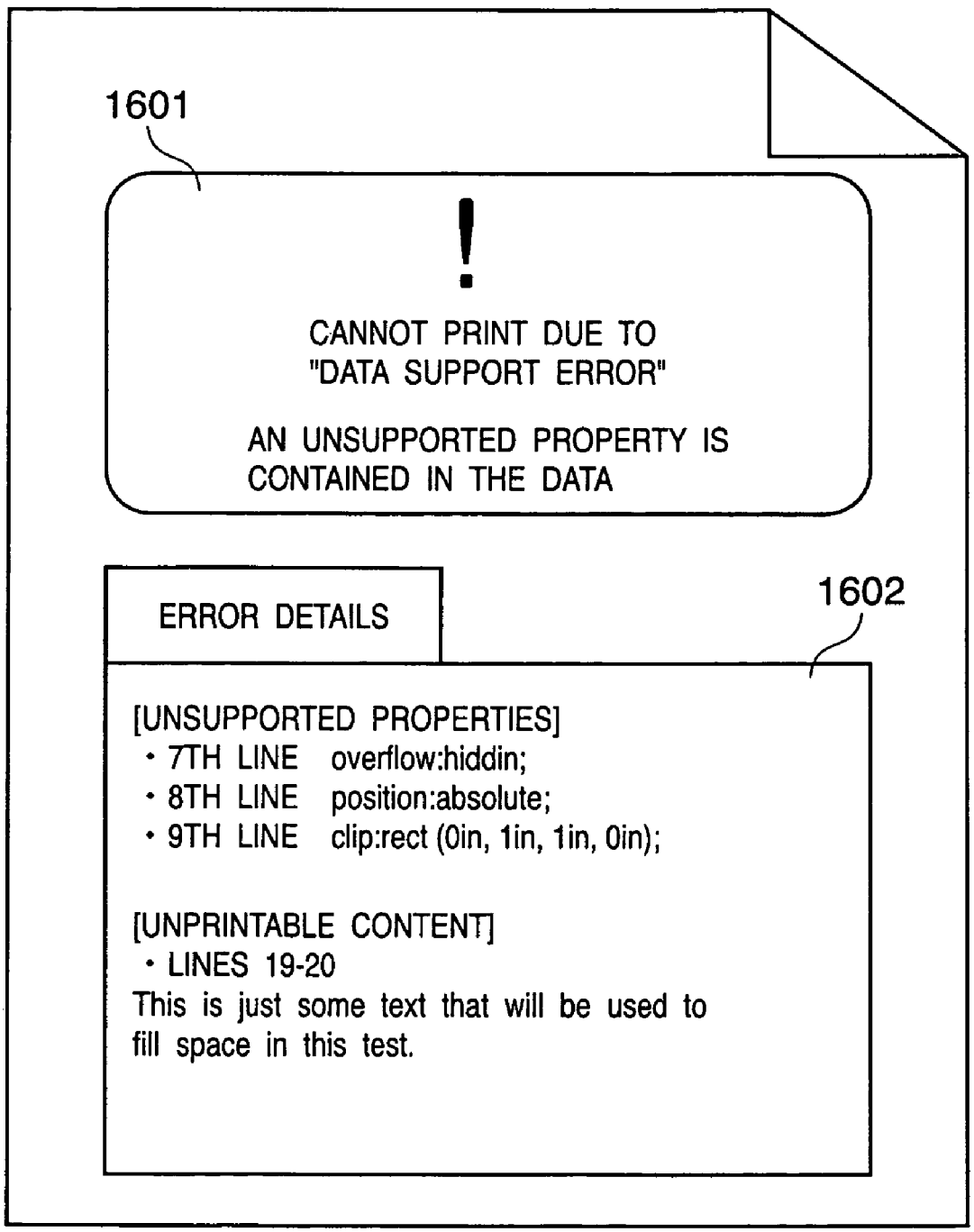
FIG. 16 is a diagram for describing an example of printing a reason for stopping printing with the printer according to the second embodiment.

FIG. 16 is a diagram for describing an example of printing a reason for stopping printing with the printer according to the second embodiment.

In the example here, a reason for stopping printing is printed in an area indicated by numeral 1601 saying "cannot print due to data support error." Then, in an area indicated by numeral 1602, the details of the error are printed.

And in yet another different example, in a case that "normal printing, high quality paper" is set as the print settings, the result of referencing the print condition table 1107 of FIG. 15 is "printing of data stopped, cannot print reason" as shown in a field 1503. Thus, it is determined at step S1210 that it is not possible to print the reason for stopping printing. Consequently, in this case processing finishes by discarding the XHTML print data without printing the reason for stopping printing.

As yet another different example, consider a case of receiving print data described in "HTML 4.0" when the structured languages that the printer 1102 supports for printing are only "XHTML Basic 1.0" and "XHTML-Print 1.0."

In this case, when the printer 1102 receives print data from the transmitter 1101 and that data requires data on the internet 1103, the data reception unit 1104 receives the print data from the internet 1103. The print data analyzer 1106 confirms the description language of the received data. If the description language of the received print data is a structured language, this is confirmable by a DOCTYPE declaration (XML declaration) given in a header of the print data. If as a result of confirmation it is found that the description language of the received print data is "HTML 4.0," a parsing error is determined as a result of this analysis. Then, if "printing of data stopped, possible to print reason" is given as a result of referencing the print condition table 1107, the reason for stopping printing is printed as shown in the print example of FIG. 17.

Figure 17:
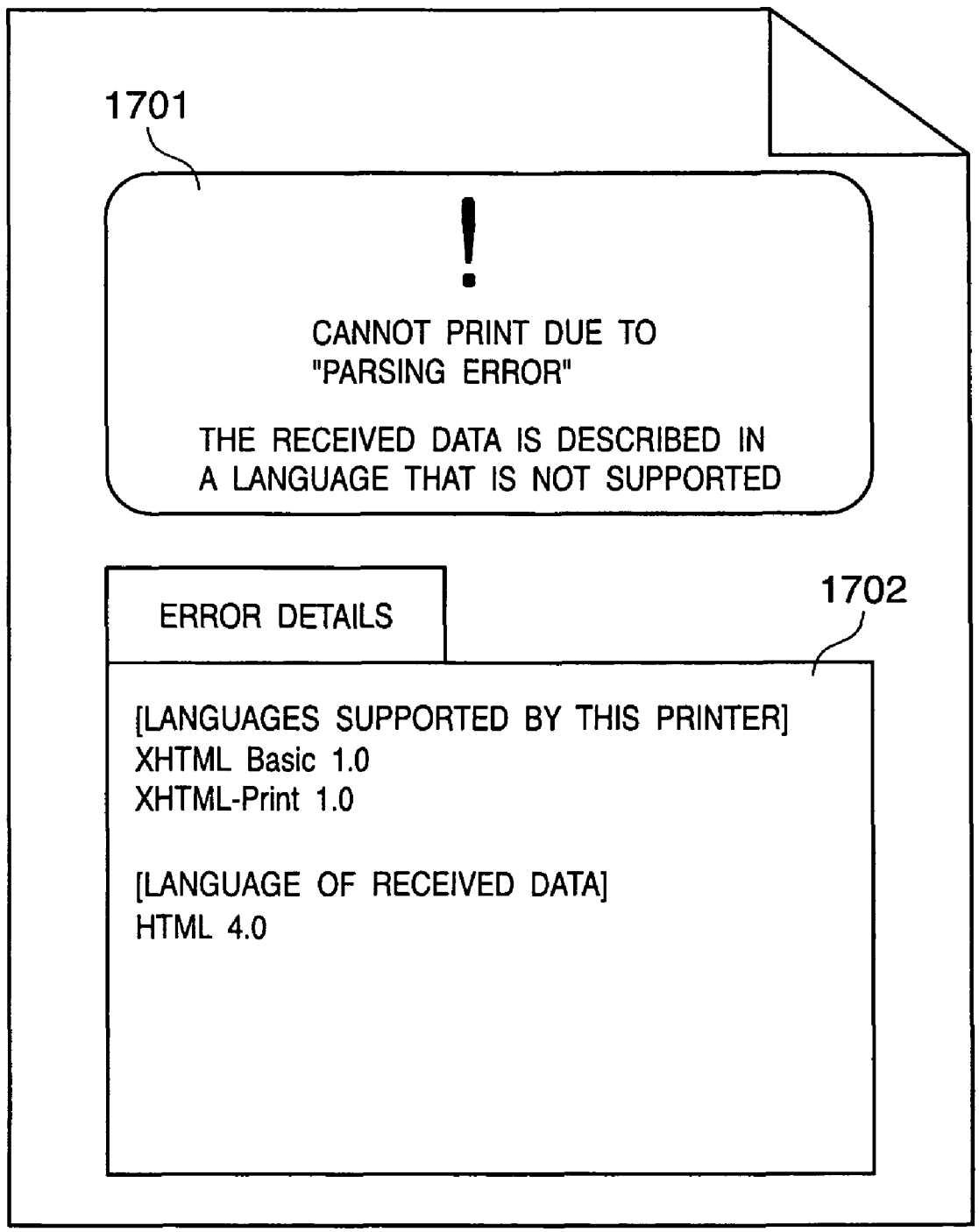
FIG. 17 is a diagram for describing an example of printing a reason for stopping printing with the printer according to the second embodiment.

FIG. 17 is a diagram for describing an example of printing a reason for stopping printing with the printer according to the second embodiment.

In this example, the received print data is described in a language that is not supported. Therefore, a message 1701 saying "cannot print because of parsing error" is printed. Further still, in an area indicated by numeral 1702, a description is printed indicating the details of the error.

With the second embodiment, even if unprintable parts are detected in the print data received by the printer, whether or not to perform printing is decided by the user at the console unit 1111 of the printer, by settings within the printing application, or according to the content of print settings that have been set separately.

Consequently, it becomes easy to avoid a case for example in which printing is not performed at all because of a part that cannot be printed even though the setting is for draft printing, or conversely a case in which printing is performed in a case that the print setting is for the highest quality printing even though there is a part that cannot be printed.

Furthermore, in a case where there are multiple parts that cannot be printed, since confirmation is made with the user before printing and then a process such as performing printing is carried out, it is possible to prevent obviously wasteful printing.

As described above, with the present embodiment, even if the printer detects unprintable parts in the print data, whether or not to perform printing can be decided by the user at the console unit of the printer, by settings within the printing application, or according to the content of print settings that have been set separately. Consequently, it becomes easy to avoid for example a case in which printing is not performed at all because of a part that cannot be printed even though the setting is for draft printing, or conversely a case in which printing is performed when the print setting is for the highest quality printing even though there is a part that cannot be printed.

Furthermore, when there are multiple parts that cannot be printed, since confirmation is made with the user before printing and then a process such as performing printing is carried out, it is possible to prevent obviously wasteful printing.

Other Embodiments

Detailed description has been given above concerning embodiments of the present invention, but the present invention may also be applied to a system constituted by a plurality of instruments, and may be applied to a device constituted by a single instrument.

It should be noted that the present invention may also be accomplished by supplying a software program that achieves the functions of the foregoing embodiments directly or remotely to a system or a device, and having a computer of the system or device read out and execute the supplied program. In this case, there is no need for the embodiment to be a program as long as the functionality of the program is provided.

Consequently, the program code itself to be installed on a computer to achieve the functional processing of the present invention on the computer may achieve the present invention. That is, the claims of the present invention also include a computer program itself for achieving the functional processing of the present invention. In this case the form of the program is of no concern, as long as the functionality of the program is provided, and it may be an object code, a program to be executed by an interpreter, or script data supplied to an OS.

Various forms of storage media can be used for supplying the program. For example, this includes floppy (registered trademark) disks, hard disks, optical disks, magneto-optical disks, MO, CD-ROM, CR-R, CR-RW, magnetic tape, non-volatile memory cards, ROM, DVD (DVD-ROM, DVD-R) and the like.

Additionally, as a method for supplying the program, it is also possible to supply the program by using a browser of a client computer to connect to a website on the internet and download the program from the website to a storage medium such as a hard disk. In this case, it may be the computer program of the present invention that is downloaded or it may be a compressed file having a self-installing function. Furthermore, it is also possible to achieve the present invention by having the program code that constitutes the program of the present invention divided into a plurality of files and downloading the respective files from different websites. That is, a WWW server that enables a plurality of users to download the program files for achieving the functional processing of the present invention on a computer is also included within the claims of the present invention.

Furthermore, the program of the present invention may also be in a form in which it is encrypted and stored on a storage medium such as a CD-ROM for distribution to users. In this case, a user who meets a predetermined condition may be allowed to download from a website via the internet information of a key that unlocks the encryption and then put the encrypted program into an executable format by using the key information and installing the program on a computer.

Furthermore, the present invention may be achieved by embodiments other than that in which the functionality of the foregoing embodiments is achieved by having a computer execute the program that has been read out. For example, an OS or the like that runs on a computer may carry out a part or all of the actual processing according to instructions of the program such that the functionality of the above-described embodiments is achieved by the processing thereof.

Further still, the program that is read out from the storage medium may be written onto a memory provided in an extension board inserted into the computer or an extension unit connected to the computer. In this case, a CPU or the like provided in the extension board or extension unit may subsequently carry out a part or all of the actual processing according to instructions of the program such that the functionality of the foregoing embodiments is achieved by the processing thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-014301, filed Jan. 23, 2006, which is hereby incorporated by reference herein in its entirety.

What is claimed is:

1. A printing apparatus, comprising:
a reception unit configured to receive print data described in structured language from a host;
an analysis unit configured to analyze the print data received by the reception unit;
a determination unit configured to determine whether or not the print data includes data that cannot be correctly printed based on analysis by the analysis unit;
a print unit configured to carry out printing based on print data analyzed by the analysis unit; and
a control unit configured to cause the print unit to print the print data, or to confirm with a user whether or not printing of the print data is carried out and to cause the print unit to print or not print the print data in accordance with the confirmation of the user, based on a determination result of the determination unit.

2. The printing apparatus according to claim 1, wherein the control unit controls whether or not to carry out printing with the print unit according to the determination result of the determination unit and print settings information that has been set for the print data.

3. The printing apparatus according to claim 1, wherein the determination result of the determination unit includes the number of the data that cannot be correctly printed in the print data determined by the determination unit.

4. The printing apparatus according to claim 1, wherein the determination result of the determination unit includes a rate of the data that cannot be correctly printed in the print data determined by the determination unit.

5. The printing apparatus according to claim 1, further comprising:
a notification unit configured to give notification that control by the control unit has been conducted for printing not to be carried out by the print unit; and a designation unit configured to designate for a reason the printing is not to be carried out to be presented in response to notification by the notification unit.

6. The printing apparatus according to claim 1, wherein in a case that the host is queried as to whether or not to carry out printing, the control unit controls printing by the print unit in response to a reply from the host.

7. The printing apparatus according to claim 1, wherein in a case that the host is queried as to whether or not to carry out printing, the control unit gives notification of the data that cannot be correctly printed in the print data to the host.

8. The printing apparatus according to claim 1, wherein the determination unit determines a first part of the print data in which the analysis unit has correctly analyzed and a second part of the print data in which the analysis unit has not correctly analyzed.

9. A printing apparatus, comprising:
a reception unit configured to receive print data described in structured language from a host;
an analysis unit configured to analyze the print data received by the reception unit;
a determination unit configured to determine the number of unprintable parts in the print data based on analysis by the analysis unit;
a print unit configured to carry out printing based on print data analyzed by the analysis unit;
a confirmation unit configured to confirm with a user whether or not to carry out printing with the print unit based on the number of unprintable parts in the print data determined by the determination unit; and a control unit configured to cause the print unit to print the print data if the user instructs to carry out printing in response to the confirmation by the confirmation unit.

10. A print control method, comprising:
- a reception step of receiving print data described in structured language from a host;
- an analysis step of analyzing the print data received in the reception step;
- a determination step of determining whether or not the print data includes data that cannot be correctly printed, based on analysis in the analysis step;
- a print step of carrying out printing based on print data analyzed in said analysis step; and
- a control step of controlling to cause the print step to print the print data or to confirm with a user whether or not printing of the print data is carried out and to cause the print step to print or not print the print data in accordance with the confirmation of the user, based on a determination result in the determination step.

11. The print control method according to claim 10, wherein in the control step, control of whether or not to carry out printing in the print step is conducted according to the determination result in the determination step and the print settings information that has been set for the print data.

12. The print control method according to claim 10, wherein the determination result in the determination step includes the number of the data that cannot be correctly printed in the print data determined in the determination step.

13. The print control method according to claim 10, wherein the determination result in the determination step includes a rate of the data that cannot be correctly printed in the print data determined in the determination step.

14. The print control method according to claim 10, further comprising:
- a notification step of giving notification that control has been conducted for printing not to be carried out in the print step; and
- a designation step of designating for a reason the printing is not to be carried out to be presented in response to notification in the notification step.

15. The print control method according to claim 10, wherein in a case that the host is queried as to whether or not to carry out printing, printing is controlled in the control step in response to a reply from the host.

16. The print control method according to claim 10, wherein in a case that the host is queried as to whether or not to carry out printing, notification is given in the control step to the host concerning the data that cannot be correctly printed in the print data.

17. A print control method, comprising:
- a reception step of receiving print data described in structured language from a host;
- an analysis step of analyzing the print data received in the reception step;
- a determination step of determining the number of unprintable parts in the print data based on analysis in the analysis step;
- a print step of carrying out printing based on print data analyzed in the analysis step; and
- a confirmation step of confirming with a user whether or not to carry out printing in the print step based on the number of unprintable parts in the print data determined in the determination step and
- a control step of causing the print step to print the print data if the user instructs to carry out printing in response to the confirmation by the confirmation unit.

18. A print system in which print data described in structured language is sent from a host to a printing apparatus for printing to be conducted,
wherein the printing apparatus comprises:
- an analysis unit configured to analyze the print data;
- a determination unit configured to determine whether or not there is unprintable data in the print data based on analysis by the analysis unit;
- a print unit configured to carry out printing based on print data analyzed by the analysis unit;
- a control unit configured to control printing by said print unit based on a determination result of said determination unit and print settings information that has been set for the print data; and
- a transmission unit configured to transmit reply information to the host in accordance with a determination result by the determination unit, and wherein the host comprises:
- a display unit configured to display information in response to the reply information transmitted by the transmission unit; and
- a print control unit configured to control printing by sending to the printing apparatus information for controlling printing in the printing apparatus in response to designation information inputted in response to the information displayed on the display unit.

19. The print system according to claim 18, wherein the reply information includes information specifying unprintable data in the print data, and the display unit specifically displays the unprintable data.

20. The print system according to claim 18, wherein the host further comprising a unit configured to change print settings information in the printing apparatus in response to the designation information inputted in response to the information displayed on the display unit, to carry out the printing of the print data.

* * * * *